United States Patent
Zhou et al.

(10) Patent No.: US 12,206,125 B2
(45) Date of Patent: Jan. 21, 2025

(54) BATTERY CELL, BATTERY, ELECTRICAL DEVICE AND DEVICE AND METHOD FOR PREPARING BATTERY CELL

(71) Applicant: CONTEMPORARY AMPEREX TECHNOLOGY (HONG KONG) LIMITED, Hong Kong (CN)

(72) Inventors: Wenlin Zhou, Ningde (CN); Xing Li, Ningde (CN); Wenwei Chen, Ningde (CN); Liangfan Xu, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 152 days.

(21) Appl. No.: 18/094,035

(22) Filed: Jan. 6, 2023

(65) Prior Publication Data

US 2023/0163405 A1  May 25, 2023

Related U.S. Application Data

(63) Continuation of application No. PCT/CN2021/098017, filed on Jun. 2, 2021.

(51) Int. Cl.
*H01M 50/30* (2021.01)
*H01M 10/04* (2006.01)
(Continued)

(52) U.S. Cl.
CPC ........... *H01M 50/30* (2021.01); *H01M 10/04* (2013.01); *H01M 10/613* (2015.04);
(Continued)

(58) Field of Classification Search
CPC ............. H01M 10/04; H01M 10/0404; H01M 10/0431; H01M 10/613; H01M 10/6551;
(Continued)

(56) References Cited

U.S. PATENT DOCUMENTS

2011/0256436 A1  10/2011  Eo
2013/0295430 A1*  11/2013  Kurahashi ......... H01M 10/0525
                                                                429/120
(Continued)

FOREIGN PATENT DOCUMENTS

CN        205050912 U        2/2016
CN        207409606 U        5/2018
(Continued)

OTHER PUBLICATIONS

CN207409606U Machine Translation (Year: 2024).*
(Continued)

*Primary Examiner* — Lingwen R Zeng
(74) *Attorney, Agent, or Firm* — Ladas & Parry LLP

(57) ABSTRACT

Described is a battery cell, which includes a casing having a first opening; an electrode assembly received in the casing, the electrode assembly having a first tab, a second tab and a third tab, the first tab having an opposite polarity to the second tab, and the third tab having the same polarity as the first tab or the second tab; an end cap for closing the first opening; an insulating member disposed between the end cap and the electrode assembly, wherein the third tab is configured to be connected with the insulating member. It is possible to improve the heat dissipation efficiency of the battery cell by additionally providing a heat dissipation path of the electrode assembly—the third tab—the insulating member—the end cap, thereby improving the overcurrent capacity and the safety performance of the battery cell.

17 Claims, 6 Drawing Sheets

(51) Int. Cl.

| | | |
|---|---|---|
| *H01M 10/613* | (2014.01) | |
| *H01M 10/6551* | (2014.01) | |
| *H01M 50/148* | (2021.01) | |
| *H01M 50/578* | (2021.01) | |
| *H01M 50/593* | (2021.01) | |
| *H01M 50/15* | (2021.01) | |
| *H01M 50/528* | (2021.01) | |
| *H01M 50/538* | (2021.01) | |
| *H01M 50/55* | (2021.01) | |
| *H01M 50/553* | (2021.01) | |
| *H01M 50/586* | (2021.01) | |

(52) U.S. Cl.
CPC ..... *H01M 10/6551* (2015.04); *H01M 50/148* (2021.01); *H01M 50/578* (2021.01); *H01M 50/593* (2021.01); *H01M 10/0404* (2013.01); *H01M 10/0431* (2013.01); *H01M 50/15* (2021.01); *H01M 50/528* (2021.01); *H01M 50/538* (2021.01); *H01M 50/55* (2021.01); *H01M 50/553* (2021.01); *H01M 50/586* (2021.01); *H01M 2220/20* (2013.01); *Y02E 60/10* (2013.01)

(58) Field of Classification Search
CPC ........... H01M 2220/20; H01M 50/148; H01M 50/15; H01M 50/30; H01M 50/528; H01M 50/538; H01M 50/55; H01M 50/553; H01M 50/578; H01M 50/586; H01M 50/593; Y02E 60/10
See application file for complete search history.

(56) References Cited

U.S. PATENT DOCUMENTS

| | | |
|---|---|---|
| 2015/0064511 A1 | 3/2015 | Wang et al. |
| 2015/0179991 A1 | 6/2015 | Katayama |
| 2019/0372085 A1 | 12/2019 | Yang et al. |
| 2021/0242549 A1 | 8/2021 | Zheng et al. |
| 2023/0261350 A1 | 8/2023 | Zheng et al. |
| 2023/0261351 A1 | 8/2023 | Zheng et al. |

FOREIGN PATENT DOCUMENTS

| | | |
|---|---|---|
| CN | 109860797 A | 6/2019 |
| CN | 209434258 U | 9/2019 |
| CN | 209993628 U | 1/2020 |
| CN | 111148382 A | 5/2020 |
| CN | 210668610 U | 6/2020 |
| CN | 212751072 U | 3/2021 |
| CN | 112771714 A | 5/2021 |
| CN | 113013503 A | 6/2021 |
| CN | 213782158 U | 7/2021 |
| JP | 2006172870 A | 6/2006 |
| JP | 2014203792 A | 10/2014 |
| JP | 2015536526 A | 12/2015 |
| JP | 2018534724 A | 11/2018 |
| JP | 2020095802 A | 6/2020 |

OTHER PUBLICATIONS

ISR for International Application PCT/CN2021/098017 mailed Mar. 2, 2022.
Written Opinion for International Application PCT/CN2021/098017 mailed Mar. 2, 2022.
JP-2023-504845-NOA Dated Apr. 1, 2024.
Extended European Search Report dated Aug. 6, 2024 for application EP 21943532.8.
Notice of Allowance for Application No. 10-2023-7002285, dated Dec. 4, 2024, 2 pages.

* cited by examiner

BATTERY CELL, BATTERY, ELECTRICAL DEVICE AND DEVICE AND METHOD FOR PREPARING BATTERY CELL

CROSS REFERENCE TO RELATED APPLICATIONS

This is a continuation of International Patent Application PCT/CN2021/098017, filed on Jun. 2, 2021. This application is incorporated herein by reference in its entirety.

TECHNICAL FIELD

The present application relates to the field of batteries, especially to a battery cell, a battery, an electrical device and a device and method for preparing the battery cell.

BACKGROUND

In recent years, with the increasing depletion of fossil energy and the increasing pressure of environmental pollution, secondary batteries have received unprecedented attention and development. The application range of the secondary batteries is more and more extensive, such as energy storage power systems such as hydraulic power, firepower, wind power and solar power stations, as well as electric tools, electric bicycles, electric motorcycles, electric vehicles, military equipment, aerospace and other fields.

The battery cell of the secondary battery will generate heat during use. If the heat dissipation is not timely or an effective heat dissipation channel is not provided, a series of chemical reactions will occur due to the too high internal temperature of the battery cell, which will lead to the decline of the performance of the battery cell, and then affect the overall performance of the secondary battery. In addition, when the overheating of the battery cell leads to excessive gas generated by an electrolyte and active substances, the internal pressure of the battery cell will increase rapidly. As the pressure that the battery case can bear is limited, there are potential safety hazards such as explosion of the battery cell.

SUMMARY OF THE INVENTION

In view of the above problems, the present invention provides a battery cell, a battery, an electrical device, and a device and a method for preparing the battery cell, which provides an additional heat dissipation channel through an additionally arranged third tab, thereby improving the heat dissipation efficiency of internal heat of the battery cell.

In the first aspect, provided is a battery cell, which includes a casing having a first opening; an electrode assembly received in the casing, the electrode assembly having a first tab, a second tab and a third tab, the first tab having an opposite polarity to the second tab, and the third tab having the same polarity as the first tab or the second tab; an end cap for closing the first opening; an insulating member disposed between the end cap and the electrode assembly, wherein the third tab is configured to be connected with the insulating member.

Therefore, the technical solution of the embodiments of the present application adds a heat dissipation path (i.e., the electrode assembly—the third tab—the insulating member—the end cap) of the battery cell, and improves the heat dissipation efficiency of the battery cell by additionally providing the third tab compared with the existing heat dissipation path (the electrode assembly—the first and second tabs—an electrode terminal) of the battery cell. In addition, the third tab is insulated from the end cap through the insulating member, that is, the casing and the end cap do not participate in a current loop, thereby improving the safety of the battery cell. Under the condition of the same current overcurrent, a temperature of the battery cell in the embodiments of the present application is lower, thereby improving the overcurrent capability and safety performance of the battery cell.

In some embodiments, the third tab is in contact with the insulating member.

Therefore, the heat of the electrode assembly can be further reliably led out, thereby improving the heat dissipation efficiency.

In some embodiments, the insulating member has a first portion in contact with the third tab, the first portion having a thickness less than thicknesses of other portions of the insulating member.

In some embodiments, a thickness of the first portion is 0.1 mm to 0.3 mm.

Therefore, on the premise of ensuring insulativity between the third tab and the end cap, a thickness of the insulating member is reduced, so that the heat dissipation efficiency of the first portion of the insulating member in contact with the third tab is further improved.

In some embodiments, the insulating member is provided with a receiving portion for receiving the third tab.

In some embodiments, the first opening faces a first direction, the receiving portion has a second opening facing a second direction, the second direction being perpendicular to the first direction, and the third tab enters the receiving portion through the second opening.

Therefore, by arranging the third tab in the receiving portion, on the one hand, the position of the third tab can be limited, so that the third tab can be better fitted with the insulating member, the heat transfer loss caused by an assembly gap is reduced, and the heat dissipation efficiency is improved; on the other hand, the bent third tab and the end face of the electrode assembly can be insulated, thus avoiding the internal short circuit of the battery cell caused by the contact between the bent third tab and the electrode assembly.

In some embodiments, the insulating member has a body and a cap plate configured to cover the first portion with an interval from the first portion in the first direction.

In some embodiments, the body and the cap plate are removably connected.

In some embodiments, the body and the cap plate are snap-connected.

In some embodiments, the cap plate is configured to press the third tab to rest the third tab against the body.

With the design that the body and the cover plate are removably connected, such as snap connection, during the installation, the third tab can be first placed at a suitable position of the first portion of the insulating member, and then the cap plate is put on, and the cap plate makes the third tab rest against the body, thus ensuring a better fit between the third tab and the insulating member and improving the heat dissipation efficiency.

In some embodiments, the end cap is provided with a pressure relief mechanism, for relieving an internal pressure of the battery cell when the internal pressure or temperature of the battery cell reaches a preset threshold, the insulating member is provided with an insulating baffle for blocking contact between the third tab and the pressure relief mechanism, and a projection of the insulating baffle is disposed between a projection of the first portion and a projection of the pressure relief mechanism in the first direction.

In some embodiments, the insulating member is provided with a pressure relief hole corresponding to the pressure relief mechanism, and the insulating baffle is provided between the first portion and the pressure relief hole for blocking the third tab from passing through the pressure relief hole.

In some embodiments, the insulating member is provided with a protruding part for ensuring that the pressure relief mechanism and the insulating member are arranged at intervals to prevent the insulating member from contacting with the pressure relief mechanism and destroying the pressure relief mechanism, the pressure relief hole is arranged on the protruding part, and the first portion and the protruding part are connected through the insulating baffle.

Therefore, by arranging the insulating baffle, the third tab can be prevented from contacting with the end cap or the pressure relief mechanism provided on the end cap, thereby ensuring the insulativity between the third tab and the end cap.

In some embodiments, a width of the insulating baffle is greater than a smaller one of a width of the third tab and a width of the protruding part in a third direction perpendicular to the first direction and the second direction.

In some embodiments, in the first direction, a height of the insulating baffle is greater than a greater one of a thickness of the third tab and a maximum distance from the pressure relief hole on the protruding part to the first portion, and the height of the insulating baffle is less than or equal to a distance from the first portion to the end face of the electrode assembly.

If the height and/or width of the insulating baffle is too large, it may cause that the third tab and the insulating member cannot be well fitted after installation, and there is a gap causing heat transfer loss, which may reduce the heat dissipation efficiency. If the height and/or width of the insulating baffle is too small, the insulation effect between the third tab and the end cap as well as the pressure relief mechanism may not be achieved by the insulating baffle. Therefore, the technical solution of the embodiments of the present application can have both good insulation and heat dissipation by reasonably setting the height and/or width of the insulation baffle.

In the second aspect, there is provided a battery including the battery cell of the first aspect.

In the third aspect, there is provided an electrical device including the battery of the second aspect for supplying electrical energy.

In the fourth aspect, there is provided a device for preparing a battery cell, which includes a module for preparing a casing having a first opening and a receiving space, the first opening communicating with the receiving space; a module for preparing an electrode assembly received in the receiving space and having a first tab, a second tab and a third tab, the first tab and the second tab being respectively configured for connecting with two electrode terminals with opposite polarities; a module for preparing an end cap for closing the first opening; a module for preparing an insulating member disposed on a side of the end cap facing the electrode assembly and configured for isolating the end cap and the electrode assembly; wherein the third tab is configured to conduct heat of the electrode assembly to the end cap through the insulating member.

In the fifth aspect, there is provided a method of preparing a battery cell, including: providing a casing having a first opening and a receiving space, the first opening communicating with the receiving space; providing an electrode assembly received in the receiving space and having a first tab, a second tab and a third tab, the first tab and the second tab being respectively configured for connecting with two electrode terminals with opposite polarities; providing an end cap for closing the first opening; providing an insulating member disposed on a side of the end cap facing the electrode assembly for isolating the end cap and the electrode assembly; wherein the third tab is configured to conduct heat of the electrode assembly to the end cap through the insulating member.

BRIEF DESCRIPTION OF DRAWINGS

The accompanying drawings, which are illustrated herein, serve to provide a further understanding for the present application and form a part of the present application, and the exemplary embodiments of the present application as well as the illustrations thereof serve to explain the present invention and do not constitute an undue limitation of the present application. In the accompanying drawings.

Figure 1:
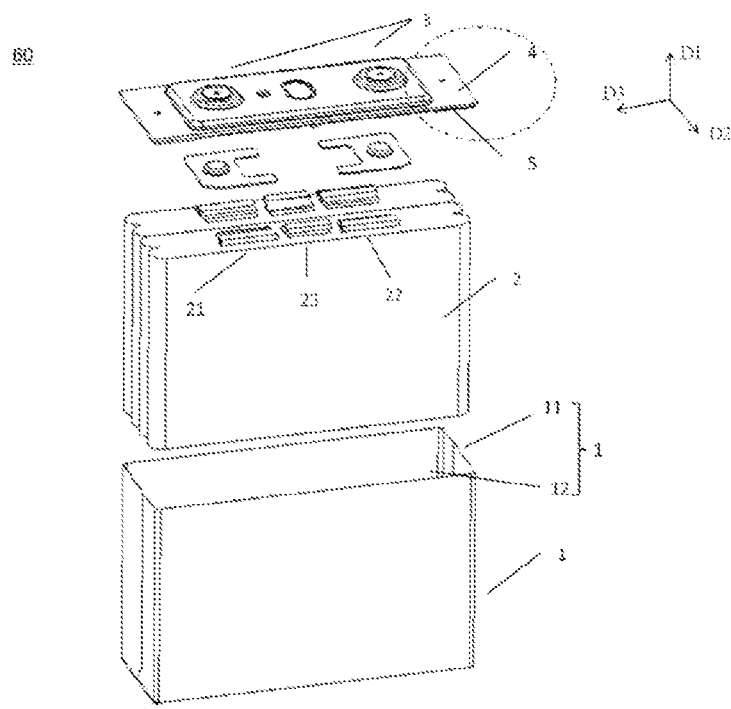
FIG. 1 is a perspective exploded view of a battery cell according to an embodiment of the present application.

ILLUSTRATIONS OF REFERENCE SIGNS 1 casing
11 first opening
12 receiving space
2 electrode assembly
21 first tab
22 second tab
23 third tab
3 electrode terminal
4 end cap
41 pressure relief mechanism
5 insulating member
51 first portion
52 receiving portion
520 second opening
521 cap plate
522 insulating baffle 53 body
54 protruding part
60 battery cell
600 device for preparing a battery cell
610 module for preparing a casing
620 module for preparing an electrode assembly
630 module for preparing an end cap
640 module for preparing an insulating member.

DETAILED DESCRIPTION

In order to make objectives, technical solutions, and advantages of the embodiments of the present application clearer, the technical solutions in the embodiments of the present application are described clearly in the following with reference to accompanying drawings in the embodiments of the embodiments of the present application. Apparently, the described embodiments are only portion rather than all of the embodiments of the present application. Based on the embodiments of the present application, all other embodiments obtained by those ordinarily skilled in the art without exerting creative effort fall within the scope of protection of the present application.

Unless otherwise defined, all technical and scientific terms used herein have the same meanings as are commonly understood by those skilled in the art of the present application. Terms used herein in the description of the present application are for the purpose of describing specific embodiments only and are not intended to limit the present application. The terms "including" and "having" and any variations thereof in the description and claims of the present application and the above description of the drawings are intended to cover non-exclusive inclusion. It needs to be noted that the terms "first", "second" and the like in the description and claims as well or the above drawings of the present application are used to distinguish similar objects rather than describe a specific order or sequence.

"Embodiments" referred to in the present application means that a particular feature, structure, or characteristic described in connection with embodiments may be included in at least one embodiment of the present application. The presence of the phrase in various places in the description does not necessarily mean the same embodiment, nor is it a separate or alternative embodiment that is mutually exclusive with other embodiments. It is explicitly and implicitly understood by those skilled in the art that the embodiments described herein may be combined with other embodiments.

In the description of the present application, it needs to be noted that, unless otherwise expressly specified and limited, the terms "install", "connect", "couple", "attach" need to be understood in a broad sense, for example, it may be fixed connection, detachable connection or integral connection; it may be direct connection or indirect connection by means of an intermediate medium, or may be the internal communication of two elements. For those ordinarily skilled in the art, the specific meanings of the above terms in the present application will be understood according to the specific circumstances.

The term "and/or" in the present application is simply a description of the association relationship of the associated objects, indicating that three relationships can exist, for example, A and/or B may indicate that A exists alone, A and B exist at the same time, and B exists alone. In addition, the character "/" in the present application generally means that the associated objects are in an "or" relationship.

As used in the present application, "multiple" refers to more than two (including two). Likewise, "multiple groups" refers to more than two (including two) groups, and "multiple pieces" refers to more than two (including two) pieces.

FIG. 1 shows a secondary battery cell 60 with a square structure. In the present application, the secondary battery includes a lithium-ion battery, a lithium-sulfur battery, a sodium-lithium-ion battery, a sodium-ion battery, a magnesium-ion battery, and the like.

Figure 2:
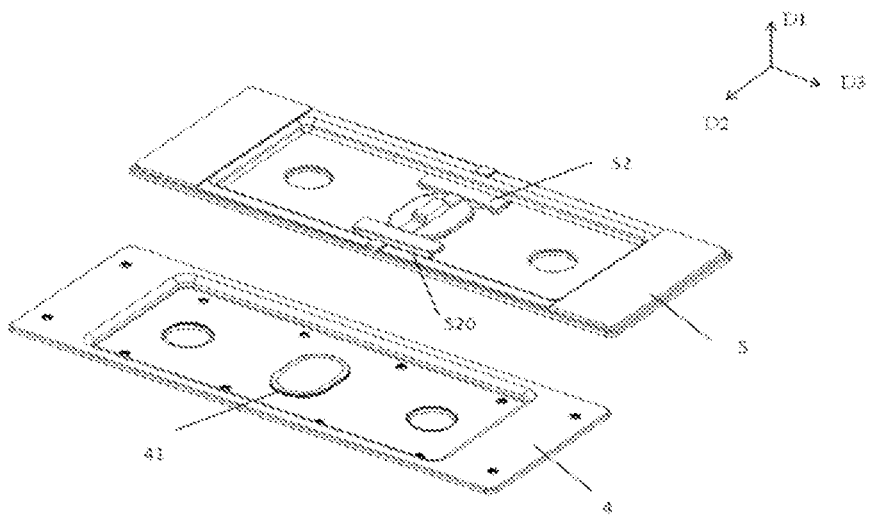
FIG. 2 is a perspective view of an end cap and an insulating member according to an embodiment of the present application.
Figure 3:
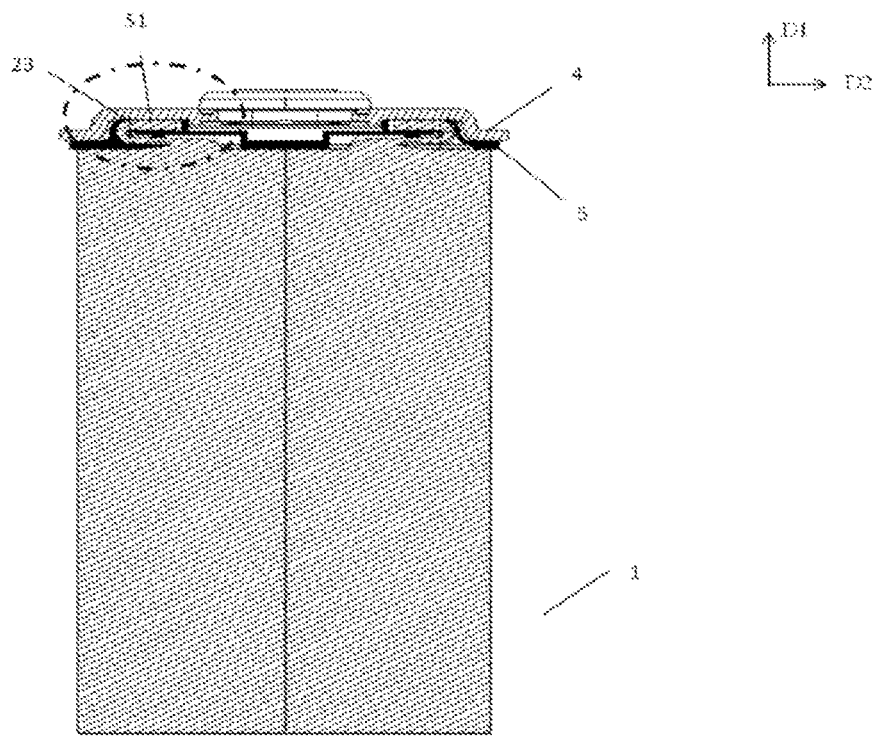
FIG. 3 is a cross sectional view of the battery cell according to an embodiment of the present application.

Referring to FIGS. 1 to 3, the secondary battery cell 60 according to an embodiment of the present application includes a casing 1 having a first opening 11; an electrode assembly 2 received in the casing 11, the electrode assembly 2 having a first tab 21, a second tab 22 and a third tab 23, the first tab 21 having an opposite polarity to the second tab 22, and the third tab 23 having the same polarity as the first tab 21 or the second tab 22; an end cap 4 for closing the first opening 11; an insulating member 5 disposed between the end cap 4 and the electrode assembly 2, wherein the third tab 23 is configured to be connected with the insulating member 5. Optionally, the third tab 23 is in contact with the insulating member 5.

The battery cell 60 may be cylindrical, flat, cuboid or other shapes. Battery cells are generally divided into three types according to the packaging mode: cylindrical battery cells, rectangular battery cells and pouch battery cells.

The battery referred to in embodiments of the present application refers to a single physical module that includes one or more battery cells to provide higher voltage and capacity. For example, the battery may include a battery module or a battery pack or the like. The battery generally includes a box for encapsulating one or more battery cells. The box can avoid liquid or other foreign matters affecting the charging or discharging of the battery cells.

A plurality of battery cells 60 may be connected in series and/or in parallel via electrode terminals for use in a variety of applications. In some high-power applications such as electric vehicles, the application of batteries includes three levels: battery cell, battery module and battery pack. With the development of technology, the level of battery module can be omitted, that is, battery packs can be directly formed from battery cells. With this improvement, the weight energy density and volume energy density of a battery system are improved, while the number of components is significantly reduced.

The battery cell 60 includes an electrode assembly and an electrolyte, the electrode assembly is composed of a positive plate, a negative plate and a separator. Battery cells work mainly depending on movement of metal ions between the positive and negative plates. The positive plate includes a positive current collector and a positive active material layer, the positive active material layer is coated on a surface of the positive current collector, the current collector not coated with the positive active material layer protrudes from the current collector coated with the positive active material layer, and the current collector not coated with the positive active material layer serves as a positive tab. In case of lithium ion batteries, a material of the positive current collector may be aluminum, and the positive active material may be lithium cobaltate, ferrous lithium phosphate, ternary lithium or lithium manganate, etc. The negative plate includes a negative current collector and a negative active material layer. The negative active material layer is coated on a surface of the negative current collector, the current collector not coated with the negative active material layer protrudes from the current collector coated with the negative active material layer, and the current collector not coated with the negative active material layer serves as a negative tab. A material of the negative current collector may be copper, and the negative active material may be carbon or silicon. In order to ensure that a large current is passed without fusing, a plurality of positive tabs are provided and stacked together, and a plurality of negative tabs are provided and stacked together. The separator may be made of PP or PE.

In the present application, the first tab 21 and the second tab 22 have opposite polarities and may be the positive tab or the negative tab above, respectively. The third tab 23 is formed in the current collector where the first tab 21 or the second tab 22 is located, that is, the third tab 23 may have the same polarity as the first tab 21 or the second tab 22.

The casing 1 is used to receive the electrode assembly 2, and one end of the casing is formed with the first opening 11. The shape of the casing 1 is not specifically limited in the present application, which may be cylindrical, square or any other shape. The casing 1 is generally made of metal or rigid plastic, to provide the necessary strength and hardness protection for the received electrode assembly 2. The number of the electrode assemblies 2 received in the casing 1 may be one or more, which can be selected by those skilled in the art according to specific actual needs.

The end cap 4 is used to close the first opening 11 of the casing 1, so as to close the electrode assembly and the electrolyte contained in the casing 1. The end cap 4 may be made of metal or rigid plastic. The end cap 4 can be attached with many functional components such as electrode terminals, explosion-proof valves or liquid injection holes.

The insulating member 5 is disposed between the end cap 4 and the electrode assembly 2, that is, on the side, facing the electrode assembly 2, of the end cap 4, that is, the insulating member 5 is disposed inside the end cap 4 and attached to the end cap 4. The insulating member 5 is used to insulate the electrode assembly 2 from the end cap 4 so that the electric energy of the electrode assembly 2 can only be connected to the electrode terminal through the positive or negative tabs. The insulating member 5 may be made of PP or PET.

Alternatively, the third tab 23 is in contact with the insulating member 5 (refer to FIG. 3). Optionally, the insulating member 5 between the end cap 4 and the electrode assembly 2 is hollowed out at a position corresponding to the electrode terminal 3, whereby when the secondary battery is charged and discharged, only a complete current loop is formed between the electrode assembly 2—the first tab 21—the electrode terminal 3—an external power supply or device—the electrode terminal 3—the second tab 22, while the third tab 23 is insulated from the end cap 4. That is, the purpose of adding the third tab 23 is not to add an additional current loop, but to lead out the heat inside the electrode assembly 2 to the end cap 4 via the insulating member 5.

Therefore, the third tab 23 adds a heat dissipation path (i.e., the electrode assembly 2—the third tab 23—the insulating member 5—the end cap 4) of the battery cell 60 compared to the existing heat dissipation path (the electrode assembly 2—the first and second tabs 21, 22—the electrode terminal 3) of the battery cell, thereby improving the heat dissipation efficiency of the battery cell. Under the condition of the same current overcurrent, a temperature of the battery cell in the embodiments of the present application is lower, thereby improving the overcurrent capability and safety performance of the battery cell. Optionally, a cooling device may be further provided on the outside of the end cap 4 of the battery cell 60, so that the heat dissipation performance of the battery cell 60 is further improved.

It needs to be noted that the battery cell 60 shown in FIGS. 1 and 2 includes two sets of electrode assemblies 2. At this time, the first to third tabs 21 to 23 are respectively provided for each set of electrode assemblies 2, that is, the number of each of the first to third tabs 21 to 23 is two. The technical solution of the present application is not limited to this, and only one set of electrode assemblies 2 may be provided in the battery cell 60. In this case, the number of each of the first to third tabs 21 to 23 may be one.

Figure 4:
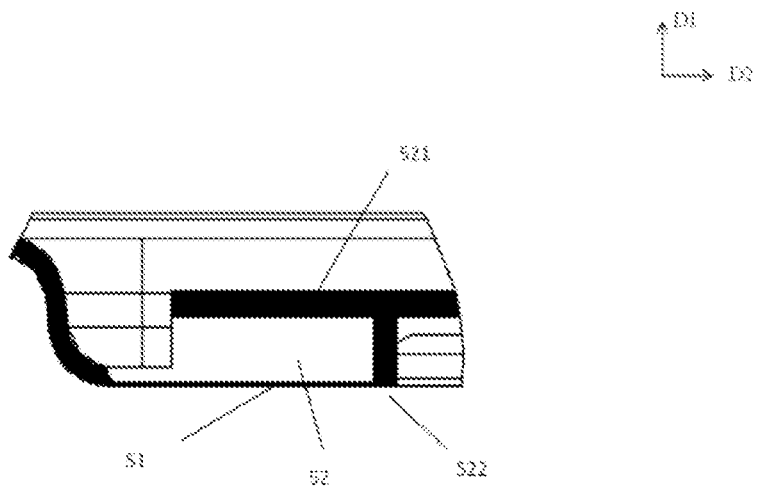
FIG. 4 is an enlarged view showing the insulating member shown in FIG. 3.

Optionally, as shown in FIGS. 3 and 4, the insulating member 5 has a first portion 51 in contact with the third tab 23, and a thickness of the first portion 51 is smaller than the thickness of other portions of the insulating member 5.

FIG. 3 shows that an upper surface of the third tab 23 is in contact with the first portion 51 of the insulating member 5 after being bent, so that the third tab 23 has a larger contact area with the insulating member 5 and the heat dissipation effect is improved.

Optionally, the thickness of the first portion 51 is 0.1 mm to 0.3 mm. The thickness of the other portion of the insulating member 5 is set according to a parameter of the battery cell 60 and is generally 0.6 mm to 0.7 mm. On the premise of ensuring the insulativity between the third tab 23 and the end cap 4, the heat dissipation efficiency is further improved by reducing the thickness of the first portion 51 of the insulating member 5 in contact with the third tab 23. In addition, the third tab 23 is in contact with the insulating member 5 after being bent and occupies a large space between the end cap 4 and the electrode assembly 2. Reducing the thickness of the first portion 51 can also make this space effectively receive the third tab 23 and improve the energy density of the battery cell 60.

Figure 5:
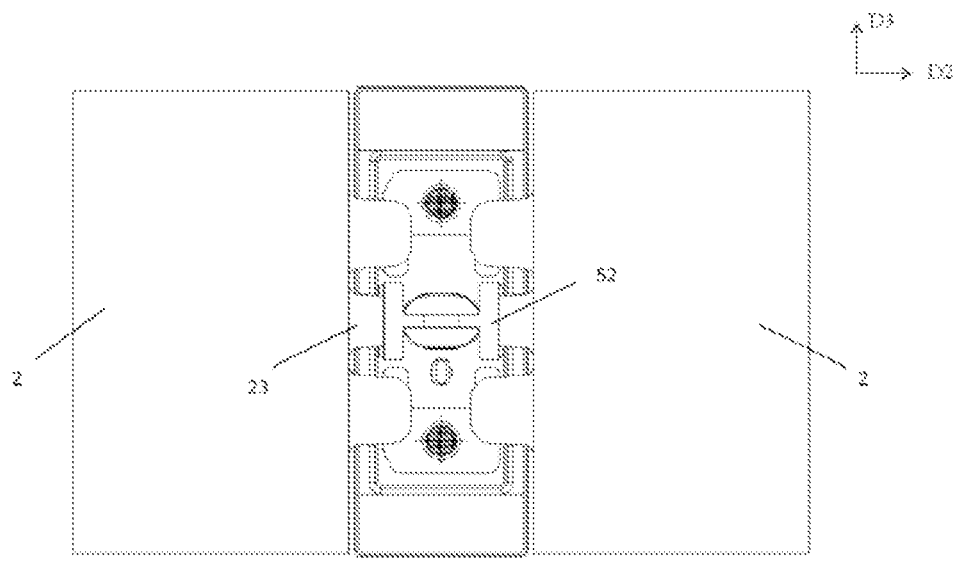
FIG. 5 is a top view of assembled electrode assembly and the insulating member according to an embodiment of the present application.
Figure 6:
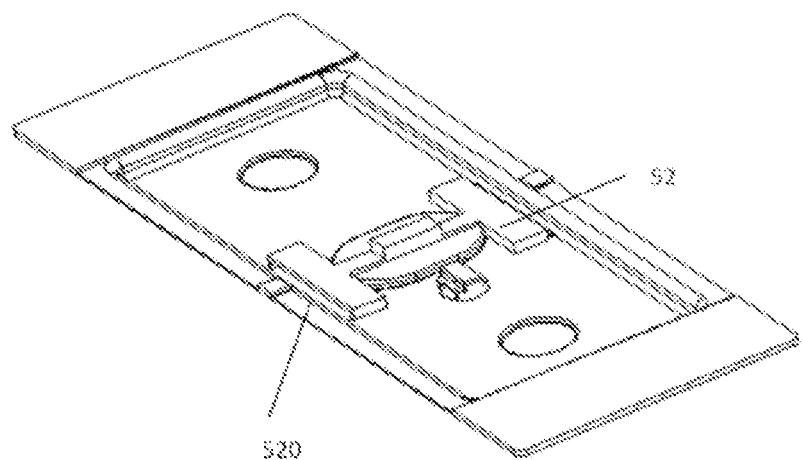
FIG. 6 is a perspective view of the insulating member according to an embodiment of the present application.

Optionally, as shown in FIGS. 5 and 6, the insulating member is further provided with a receiving portion 52 for receiving the third tab 23.

In the embodiment of the present application, optionally, when a state in which the battery cells are placed upright with the electrode terminals facing up or down is optionally defined, a height direction of the battery cells in a vertical direction is a direction D1, a thickness direction of the battery cells is a direction D2, and a width direction of the battery cells is a direction D3, as shown in FIG. 1.

The receiving portion is formed in a cavity structure (refer to FIG. 4) having an opening (second opening 520) on one side surface, that is, the receiving portion has a top surface and a bottom surface opposite each other in the first direction D1, wherein the bottom surface includes a first portion 51; and a side surface connecting the top surface and the bottom surface in the first direction D1.

The second opening 520 of the receiving portion 52 faces the second direction D2 which is perpendicular to the first direction D1 to which the first opening 11 faces, and the third tab 23 enters the receiving portion 52 through the second opening 520.

Therefore, by arranging the third tab 23 in the receiving portion 52, on the one hand, the position of the third tab 23 can be limited, so that the third tab 23 can be better fitted with the insulating member 5, the heat transfer loss caused by the assembly gap is reduced, and the heat dissipation efficiency is improved; on the other hand, the third tab 23 and the end face of the electrode assembly 2 can be insulated, thus avoiding the internal short circuit of the battery cell 60 caused by the contact between the third tab 23 and the electrode assembly 2.

Figure 7:
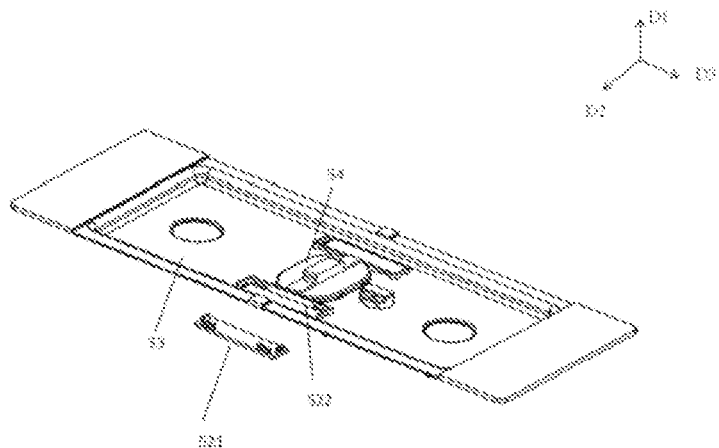
FIG. 7 is a perspective view of the insulating member according to another embodiment of the present application.

Alternatively, as shown in FIG. 7, the insulating member 5 has a body 53 and a cap plate 521. The body 53 is a portion fitted to the insulating member 5 provided on the end cap 4, and the cap plate 521 is a portion provided below the body 53 closer to the insulating member 5 of the electrode assembly 2. Optionally, the cap plate 521 is provided to cover the first portion 51 with an interval from the first portion 51 in the first direction D1. Thus, the body 53 and the cap plate 521 form a receiving portion 52 in which the third tab 23 is received. It needs to be noted that when an interval between the cap plate 521 and the first portion 51 is too large, a contact area between the third tab 23 and the first portion 51 is reduced and a degree of fitting is reduced, so that the heat dissipation efficiency is reduced. Therefore, it is preferable that the third tab 23 and the first portion 51 are tightly fitted by the cap plate 521. For example, the interval may be set to be slightly smaller than the thickness of the third tab 23 (i.e., the third tab 23 and the receiving portion 52 are interference fitted), whereby once the third tab 23 is inserted into the receiving portion through the second opening 520, the third tab 23 can be continuously tightly fitted to the first portion 51 even during use of the battery.

The body 53 and the cap plate 521 can be integrally molded to save processes and improve product production efficiency. Alternatively, as shown in FIG. 7, the body 53 and the cap plate 521 can be removably connected. Optionally, the body 53 and the cap plate 521 can be snap-connected to facilitate machining and reduce manufacturing costs.

Optionally, the cap plate 521 is configured to press the third tab 23 to rest the third tab 23 against the body 53. Thus, through the removable connection between the body 53 and the cap plate 521, during the installation process, the third tab 23 can be first placed at a suitable position of the first portion 51 of the insulating member 5, and then the cap plate 521 is put on, and the cap plate 521 makes the third tab 23 rest against the body 53, thereby ensuring better fit between the third tab 23 and the insulating member 5 and improving the heat dissipation efficiency.

Optionally, the end cap 4 is provided with a pressure relief mechanism 41 (refer to FIG. 2) for relieving an internal pressure of the battery cell 60 when the internal pressure or temperature of the battery cell 60 reaches a preset threshold. The insulating member 5 is provided with an insulating baffle 522 (refer to FIG. 7) for blocking contact between the third tab 23 and the pressure relief mechanism 41. In the first direction D1, a projection of the insulating baffle 522 is provided between a projection of the first portion 51 and a projection of the pressure relief mechanism 41. The insulating baffle 522 may be a sidewall of the receiving portion 52 opposite the second opening 520 in the second direction D2.

Optionally, a pressure relief hole (not shown) corresponding to the pressure relief mechanism 41 is provided in the insulating member 5. The pressure relief hole provides a pressure relief channel between the inside of the battery cell 60 and the pressure relief mechanism 41 on the end cap 4. The insulating baffle 522 is provided between the first portion 51 and the pressure relief hole for blocking the third tab 23 from contacting the end cap 4 through the pressure relief hole, thus ensuring the insulativity between the third tab 23 and the end cap 4.

Optionally, as shown in FIGS. 2 and 7, the insulating member 5 has a protruding part 54 for ensuring that the pressure relief mechanism 41 and the insulating member 5 are arranged at intervals, to provide a relief space for the pressure relief mechanism 41, and prevent the insulating member 5 from contacting the pressure relief mechanism 41 and damaging the pressure relief mechanism 41. The pressure relief hole may be provided on the protruding part 54, and the first portion 51 and the protruding part 54 are connected by the insulating baffle 522. Therefore, it is possible to ensure that the third tab 23 is insulated from the end cap 4.

Optionally, a width of the insulating baffle 522 is larger than a smaller one of a width of the third tab 23 and a width of the protruding part 54 in the third direction D3 perpendicular to the first direction D1 and the second direction D2. Thus, the insulating baffle 522 can prevent the third tab 23 from contacting the end cap 4 through the pressure relief hole provided in the protruding part 54, thereby ensuring the insulativity between the third tab 23 and the end cap 4.

Optionally, in the first direction D1, a height of the insulating baffle 522 is greater than a greater one of a thickness of the third tab 23 and a maximum distance from the pressure relief hole on the protruding part 54 to the first portion 51, and the height of the insulating baffle 522 is less than or equal to a distance from the first portion 51 to the end face of the electrode assembly 2. Therefore, it is possible to ensure that the third tab 23 cannot contact the end cap 4 through the pressure relief hole provided in the protruding part 54, and to avoid the problem that the casing and the end cap cannot be adapted due to the too high height of the insulating baffle.

Therefore, by reasonably setting the height and width of the insulating baffle 522, on the one hand, it is possible to ensure that the third tab 23 and the insulating member 5 are closely fitted, and the heat dissipation efficiency is improved; on the other hand, it is possible to ensure the insulativity between the third tab 23 and the end cap 4 and the pressure relief mechanism 41 so that good insulation and heat dissipation can be achieved at the same time.

It is worth noting that, as shown in FIGS. 5 and 6, when the battery cell 60 includes two sets of electrode assemblies 2 stacked in the second direction D2, that is, when the number of each of the first tab 21, the second tab 22 and the third tab 23 is two, the third tab 23 may be located between the first tab 21 and the second tab 22 and at a position corresponding to a position where the protruding part 54 is located. The receiving portions 52 are provided for each third tab 23, and the two receiving portions 52 are provided opposite each other in the second direction D2 via the protruding part 54 of the insulating member 5. Therefore, the space design can be made more compact.

Figure 8:
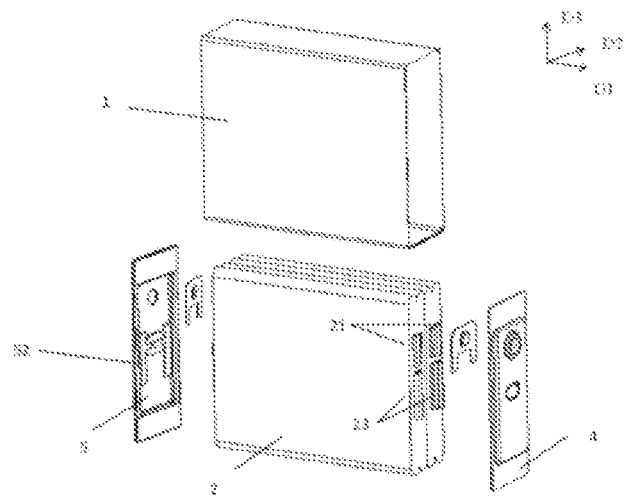
FIG. 8 is a perspective exploded view of a battery cell according to another embodiment of the present application.

In addition, various modifications can be made to the technical solution of the present application. For example, as shown in FIG. 8, the first tab 21 and the second tab and 22 may be respectively disposed at two ends of the electrode assembly 2 in the first direction D1. The third tabs 23 may be plural, and the multiple third tabs 23 may be provided at one end or two ends of the electrode assembly 2 in the first direction D1, respectively.

In addition, the present application also provides a battery, which includes the battery cell of the present application. The battery may also include other structures, which will not be described here. For example, the battery may also include a bus component for effecting electrical connection between a plurality of battery cells 60 such as in parallel or series or in parallel-series connection.

Figure 9:
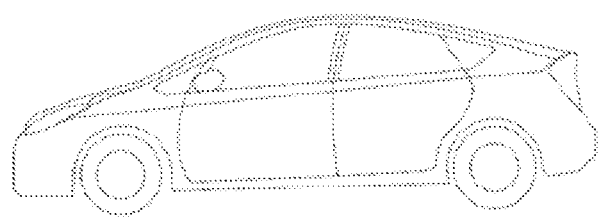
FIG. 9 is a schematic diagram of a device in which a battery is used as a power supply according to an embodiment of the present application.

In addition, one embodiment of the present application also provides an electrical device which may include the battery cell 60 of the previous embodiments. Optionally, as shown in FIG. 9, the electrical device may be a vehicle, a ship or a spacecraft.

The battery cell of the embodiment of the present application has been described above with reference to FIGS. 1 to 8, and the device and method for preparing the battery cell of the embodiment of the present application will be described below with reference to FIGS. 9 and 10, where portions not described in detail can be referred to the preceding embodiments.

Figure 10:
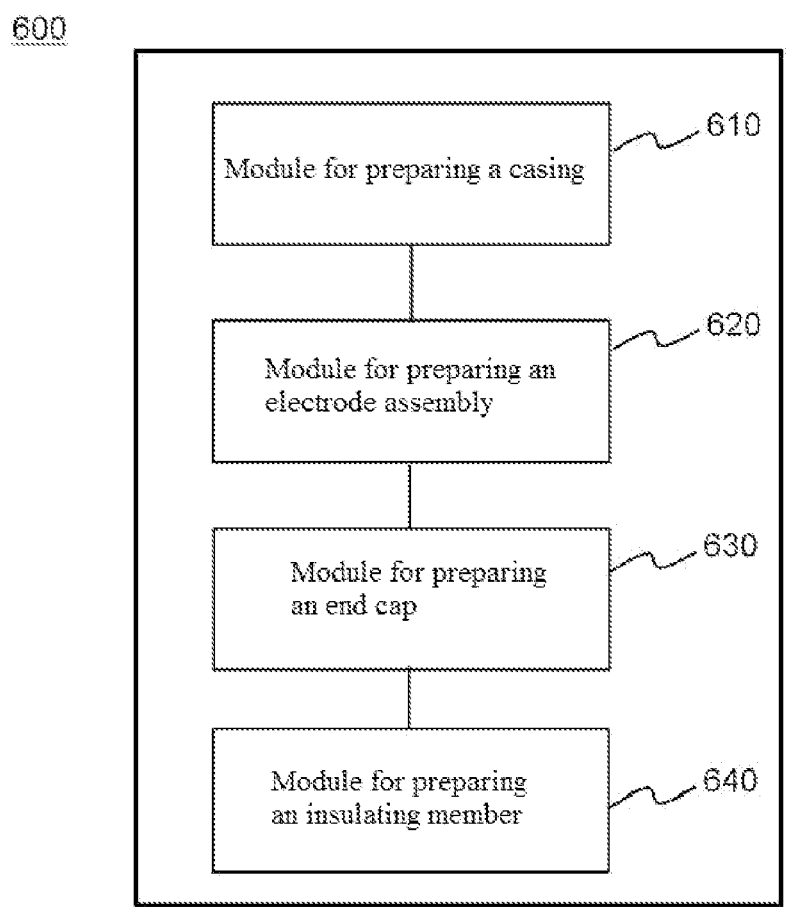
FIG. 10 is a schematic diagram of a device for preparing a battery cell according to an embodiment of the present application.

FIG. 10 illustrated a schematic diagram of a device 600 for preparing a battery cell according to an embodiment of the present application. A device 600 for preparing a battery cell according to an embodiment of the present application includes a module 600 for preparing a casing having a first opening and a receiving space; a module 620 for preparing an electrode assembly received in the receiving space and having a first tab, a second tab and a third tab, the first tab having an opposite polarity to the second tab, and the third tab having the same polarity as the first tab or the second tab; a module 630 for preparing an end cap for closing the first opening; a module 640 for preparing an insulating member disposed between the end cap and the electrode assembly; wherein the third tab is configured to be connected with the insulating member.

Figure 11:
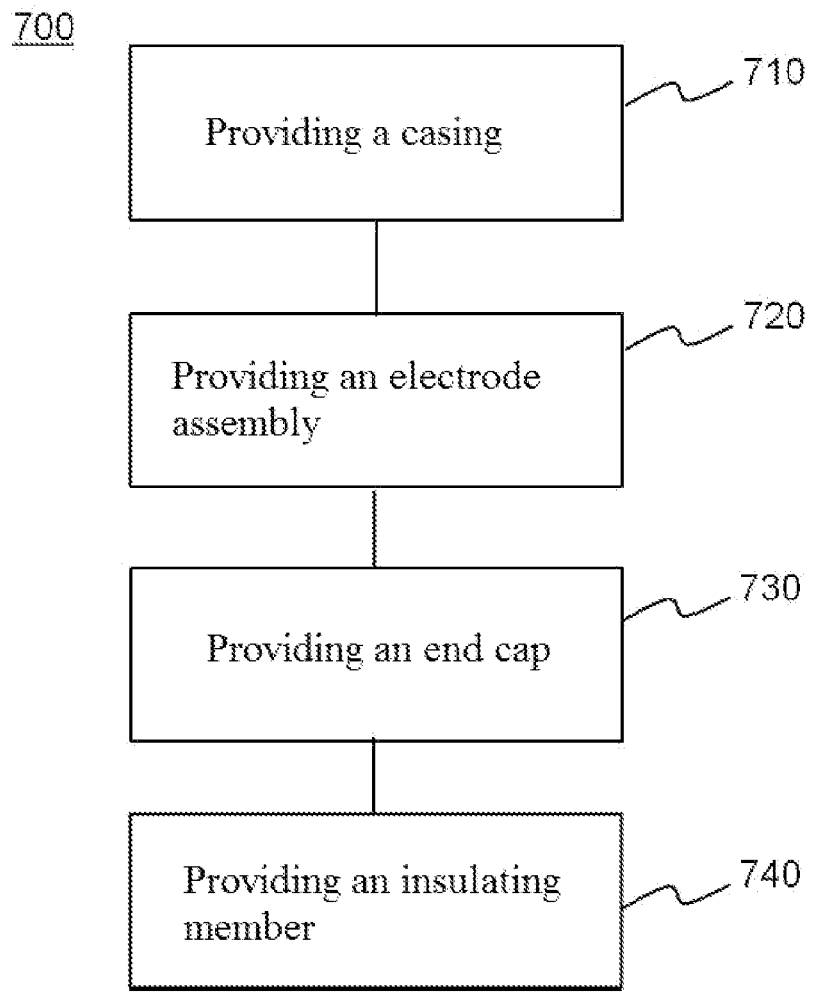
FIG. 11 is a schematic diagram of a method of preparing a battery cell according to an embodiment of the present application.

FIG. 11 is a schematic diagram of a method 700 of preparing a battery cell according to an embodiment of the present application. As shown in FIG. 10, the method 700 includes: step 710, providing a casing, the casing having a first opening and a receiving space; step 720, providing an electrode assembly received in the receiving space and having a first tab, a second tab and a third tab, the first tab having an opposite polarity to the second tab, and the third tab having the same polarity as the first tab or the second tab; step 730, providing an end cap for closing the first opening; step 740, providing an insulating member disposed between the end cap and the electrode assembly; wherein the third tab is configured to be connected with the insulating member.

Finally, it needs to be noted that the present application is not limited to the above embodiments. The above-mentioned embodiments are only for illustrative purpose, and the embodiments having substantially the same structure as the technical idea and exerting the same function and effect within the scope of the technical solution of the present application are all included in the technical scope of the present application. Further, without departing from the scope of the intention of the present application, various modifications are applied to the embodiments that are conceivable to those skilled in the art, and other ways constructed by combining a part of the constituent elements of the embodiments are also included in the scope of the present application.

What is claimed is:

1. A battery cell comprising:
   a casing having a first opening;
   an electrode assembly received in the casing, the electrode assembly having a first tab, a second tab and a third tab, the first tab having an opposite polarity to the second tab, and the third tab having the same polarity as the first tab or the second tab;
   an end cap for closing the first opening; and
   an insulating member disposed between the end cap and the electrode assembly,
   wherein the insulating member is provided with a body and a cap plate,
   the cap plate being configured to cover the first portion with an interval from the first portion in a first direction,
   wherein the insulating member is provided with a receiving portion for receiving the third tab, wherein the third tab is configured to be connected with the insulating member.

2. The battery cell according to claim 1, wherein the third tab is in contact with the insulating member.

3. The battery cell according to claim 2, wherein the insulating member has a first portion in contact with the third tab, the first portion having a thickness less than thicknesses of other portions of the insulating member.

4. The battery cell according to claim 3, wherein a thickness of the first portion is 0.1 mm to 0.3 mm.

5. The battery cell according to claim 1, wherein the first opening faces a first direction, and
   the receiving portion has a second opening facing a second direction, the second direction being perpendicular to the first direction, and the third tab enters the receiving portion through the second opening.

6. The battery cell according to claim 1, wherein the body and the cap plate are removably connected.

7. The battery cell according to claim 6, wherein the body and the cap plate are snap-connected.

8. The battery cell according to claim 1, wherein the cap plate is configured to press the third tab to rest the third tab against the body.

9. The battery cell according to claim 1, wherein the end cap is provided with a pressure relief mechanism, for relieving an internal pressure of the battery cell when the internal pressure or temperature of the battery cell reaches a preset threshold;
   the insulating member is provided with an insulating baffle for blocking contact between the third tab and the pressure relief mechanism; and
   a projection of the insulating baffle is disposed between a projection of the first portion and a projection of the pressure relief mechanism in the first direction.

10. The battery cell according to claim 9, wherein the insulating member is provided with a pressure relief hole corresponding to the pressure relief mechanism, and the insulating baffle is provided between the first portion and the pressure relief hole for blocking the third tab from passing through the pressure relief hole.

11. The battery cell according to claim 9, wherein the insulating member is provided with a protruding part for enabling the pressure relief mechanism and the insulating member to be arranged at intervals, the pressure relief hole being arranged on the protruding part, and
   the first portion and the protruding part are connected through the insulating baffle.

12. The battery cell according to claim 11, wherein a width of the insulating baffle is greater than a smaller one of a width of the third tab and a width of the protruding part in a third direction perpendicular to the first direction and the second direction.

13. The battery cell according to claim 11, wherein in the first direction, a height of the insulating baffle is greater than a greater one of a thickness of the third tab and a maximum distance from the pressure relief hole on the protruding part to the first portion, and the height of the insulating baffle is less than or equal to a distance from the first portion to an end face of the electrode assembly.

14. A battery comprising the battery cell of claim 1.

15. An electrical device comprising the battery of claim 14 for supplying electrical energy.

16. A device for preparing a battery cell comprising:
   a module for preparing a casing having a first opening and a receiving space;
   a module for preparing an electrode assembly received in the receiving space and having a first tab, a second tab and a third tab, the first tab having an opposite polarity to the second tab, and the third tab having the same polarity as the first tab or the second tab;

a module for preparing an end cap for closing the first opening; and a module for preparing an insulating member disposed between the end cap and the electrode assembly, wherein the insulating member is provided with a body and a cap plate, the cap plate being configured to cover the first portion with an interval from the first portion in a first direction, wherein the insulating member is provided with a receiving portion for receiving the third tab, wherein the third tab is configured to be connected with the insulating member.

17. A method of preparing a battery cell comprising:

providing a casing, the casing having a first opening and a receiving space;

providing an electrode assembly received in the receiving space and having a first tab, a second tab and a third tab, the first tab having an opposite polarity to the second tab, and the third tab having the same polarity as the first tab or the second tab;

providing an end cap for closing the first opening; and providing an insulating member disposed between the end cap and the electrode assembly, wherein the insulating member is provided with a body and a cap plate, the cap plate being configured to cover the first portion with an interval from the first portion in a first direction, wherein the insulating member is provided with a receiving portion for receiving the third tab, wherein the third tab is configured to be connected with the insulating member.

* * * * *